US009698983B2

(12) United States Patent
Holtmanns et al.

(10) Patent No.: US 9,698,983 B2
(45) Date of Patent: Jul. 4, 2017

(54) METHOD AND APPARATUS FOR DISABLING ALGORITHMS IN A DEVICE

(71) Applicant: Nokia Technologies Oy, Espoo (FI)

(72) Inventors: Silke Holtmanns, Klaukkala (FI); Rune Lindholm, Sottunga (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/419,316

(22) PCT Filed: Oct. 9, 2012

(86) PCT No.: PCT/IB2012/055448
§ 371 (c)(1),
(2) Date: Feb. 3, 2015

(87) PCT Pub. No.: WO2014/057305
PCT Pub. Date: Apr. 17, 2014

(65) Prior Publication Data
US 2015/0222433 A1  Aug. 6, 2015

(51) Int. Cl.
*H04L 9/14* (2006.01)
*H04W 12/00* (2009.01)
(Continued)

(52) U.S. Cl.
CPC .............. *H04L 9/14* (2013.01); *H04L 9/16* (2013.01); *H04L 63/06* (2013.01); *H04L 63/20* (2013.01);
(Continued)

(58) Field of Classification Search
CPC .. H04L 9/14–9/16; H04L 63/06; H04L 63/20; H04L 67/34; H04L 2209/80; H04W 12/00; H04W 12/04; G06F 21/602
See application file for complete search history.

(56) References Cited

U.S. PATENT DOCUMENTS 5,748,739 A    5/1998  Press
6,836,847 B1 * 12/2004 Zinger .................... G06F 21/86
                                                       713/193
(Continued)

FOREIGN PATENT DOCUMENTS

EP     1 575 244 A2    9/2005

OTHER PUBLICATIONS

International Search Report and Written Opinion received for corresponding Patent Cooperation Treaty Application No. PCT/IB2012/055448, dated Oct. 30, 2013, 12 pages.
(Continued)

*Primary Examiner* — Linglan Edwards
*Assistant Examiner* — Kevin Bechtel
(74) *Attorney, Agent, or Firm* — Alston & Bird LLP

(57) ABSTRACT

An apparatus for enabling removal or disabling of weak algorithms may include a processor and memory storing executable computer program code that cause the apparatus to at least perform operations including receiving an indication of one or more algorithms utilized by a communication device. The computer program code may further cause the apparatus to determine whether one or more of the algorithms are identified as a weak algorithm. The computer program code may further cause the apparatus to enable provision of a message to the communication device instructing the communication device to remove, disable, or assign at least one condition to at least one detected weak algorithm among the algorithms. Corresponding methods and computer program products are also provided.

14 Claims, 7 Drawing Sheets

(51) Int. Cl.
  *H04L 29/06* (2006.01)
  *H04L 9/16* (2006.01)
  *H04W 12/04* (2009.01)
  *H04L 29/08* (2006.01)
  *H04W 4/00* (2009.01)
(52) U.S. Cl.
  CPC ........... *H04W 12/00* (2013.01); *H04W 12/04* (2013.01); *H04L 67/34* (2013.01); *H04L 2209/80* (2013.01); *H04W 4/005* (2013.01)

(56) References Cited

U.S. PATENT DOCUMENTS

| | | | |
|---|---|---|---|
| 6,957,348 B1 | 10/2005 | Flowers et al. | |
| 2004/0034771 A1 | 2/2004 | Edgett et al. | |
| 2004/0103411 A1 | 5/2004 | Thayer | |
| 2005/0111666 A1 | 5/2005 | Blom et al. | |
| 2005/0193387 A1 | 9/2005 | Uramatsu et al. | |
| 2005/0235342 A1 | 10/2005 | Ene-Pietrosanu et al. | |
| 2007/0266421 A1* | 11/2007 | Vaidya | H04L 63/20 726/1 |
| 2008/0130895 A1* | 6/2008 | Jueneman | H04L 9/3066 380/277 |
| 2010/0180118 A1* | 7/2010 | Nakatsugawa | G06F 21/72 713/169 |
| 2011/0138469 A1 | 6/2011 | Ye et al. | |
| 2012/0033804 A1 | 2/2012 | Soquet | |
| 2012/0225641 A1 | 9/2012 | Chen et al. | |

OTHER PUBLICATIONS

Ericsson; ST-Ericksson: "Updated pCR on solution 9 and NAS signaling", 3GPP Draft; S3-101411, Nov. 18, 2010; Section 3.
Supplementary European Search Report for Application No. EP 12 88 6225 dated May 17, 2016.
Office Action for European Application No. 12 886 225.7 dated Feb. 24, 2017.
Chechik, Marsha et al. "Bisimulation analysis of SDL-expressed protocols: a case study". CASCON '00 Proceedings of the 2000 conference of the Centre for Advanced Studies on Collaborative research; IBM Press, 2000. pp. 2.

* cited by examiner

METHOD AND APPARATUS FOR DISABLING ALGORITHMS IN A DEVICE

RELATED APPLICATION

This application was originally filed as Patent Cooperation Treaty Application No. PCT/IB2012/055448 filed Oct. 9, 2012.

TECHNOLOGICAL FIELD

An example embodiment of the invention relates generally to wireless communication technology and, more particularly, relates to a method and apparatus for providing a communication protocol for disabling or removing algorithms in communication devices.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. Due to the now ubiquitous nature of electronic communication devices, people of all ages and education levels are utilizing electronic devices to communicate with other individuals or contacts, receive services and/or share information, media and other content. One area in which there is a demand to increase ease of information transfer relates to the delivery of services to communication devices. The services may be in the form of a particular application or algorithm to facilitate functionality of the communication devices. Some of the algorithms being utilized by the communication devices may be cryptographic algorithms providing security for usage of the algorithms.

At present, many machines and devices utilize machine type communication. Some of these machines and devices (for example, sensors, actuators, and meters) may be unattended by users and may not facilitate user interaction. Machine type communication may allow machines and devices to function with a long lifespan. For example, many metering devices are expected to be active for more than twenty years. This long lifespan may pose some problems pertaining to the security of algorithms of the communication devices. For instance, at present it is difficult to remove weak algorithms from being utilized by deployed devices and this issue is usually tackled by phasing out, where new devices only have stronger algorithms and no longer the weak ones and then by natural replacement the device population shifts towards the newer algorithms (for mobile devices typical replacement cycles are 2-3 years). The weak algorithms may be unsecure algorithms that may be targeted for attack. In many instances, the lifespan of devices are much longer than the algorithms are able to securely support. The inability to sufficiently secure algorithms over long lifespans of devices may be due to advances in technology over time that may enable more computing computation for brute force attacks. In addition, due to advances in technology over time, the encryption keys associated with cryptographic algorithms may not be strong enough to prevent hackers from breaching the security of the algorithms.

Currently, some existing solutions consist of including two or more algorithms onto a device, such that if one of the algorithms is determined to be weak, there is another algorithm to utilize as a backup algorithm. At present, this approach is oftentimes unsuccessful since the weak algorithm may not be permanently disabled.

When a weak algorithm is still available, a system may be susceptible to a "bidding down attack" in which an attacker posing as a network node may indicate that it only supports a weak algorithm (for example, an unsecure algorithm) in which case the device may comply and utilize the weak algorithm which may result in a security breach.

SUMMARY

A method and apparatus are therefore provided for automatically removing or disabling one or more algorithms from a communication device(s). In this regard, an example embodiment may provide a communication protocol enabling remote disabling or removal of weak algorithms (for example, cryptographic algorithms that are susceptible to being broken) on one or more communication devices. The communication devices in which the algorithms may be disabled or removed may, but need not, be unattended by a user. As such, the disabling or removal of the algorithm(s) from a communication device(s) may be performed without user interaction via the communication device. In some example embodiments, the communication devices may not include user interfaces. However, in other example embodiments, user interfaces may be included in the communication devices.

In one example embodiment, a weak algorithm(s) may be disabled or removed in an instance in which a communication device attempts to connect to a network device by using the weak algorithm. In some instances, a communication device may contact a network device providing an indication (for example, a list) of supported algorithms (for example, security algorithms). The network device may indicate to the communication device to use a stronger algorithm for communications with the network device via a communication channel.

The network device may also determine one or more weak algorithms supported by the communication device and may instruct the communication device to remove or disable the detected weak algorithm(s). In response to receipt of the instruction from the network device, the communication device may remove or disable the weak algorithm(s). In this regard, the communication device may be updated by removing less secure algorithms that may be outdated and obsolete.

In one example embodiment, a method for enabling removal or disabling of weak algorithms is provided. The method may include receiving an indication of one or more algorithms utilized by a communication device. The method may further include determining whether one or more of the algorithms are identified as a weak algorithm. The method may further include enabling provision of a message to the communication device instructing the communication device to remove, disable, or assign at least one condition to at least one detected weak algorithm among the algorithms.

In another example embodiment, an apparatus for enabling removal or disabling of weak algorithms is provided. The apparatus may include a processor and a memory including computer program code. The memory and computer program code are configured to, with the processor, cause the apparatus to at least perform operations including receiving an indication of one or more algorithms utilized by a communication device. The memory and computer program code are further configured to, with the processor, cause the apparatus to determine whether one or more of the algorithms are identified as a weak algorithm. The memory and computer program code are further configured to, with the processor, cause the apparatus to enable provision of a message to the communication device instructing the communication device to remove, disable, or assign at least one condition to at least one detected weak algorithm among the algorithms.

In another example embodiment, a computer program product for enabling removal or disabling of weak algorithms is provided. The computer program product includes at least one computer-readable storage medium having computer-readable program code portions stored therein. The computer-executable program code instructions may include program code instructions configured to cause receipt of an indication of one or more algorithms utilized by a communication device. The program code instructions may also determine whether one or more of the algorithms are identified as a weak algorithm. The program code instructions may also enable provision of a message to the communication device instructing the communication device to remove, disable, or assign at least one condition to at least one detected weak algorithm among the algorithms.

In yet another example embodiment, an apparatus for enabling removal or disabling of weak algorithms is provided. The apparatus may include means for receiving an indication of one or more algorithms utilized by a communication device. The apparatus may also include means for determining whether one or more of the algorithms are identified as a weak algorithm. The apparatus may also include means for enabling provision of a message to the communication device instructing the communication device to remove, disable, or assign at least one condition to at least one detected weak algorithm among the algorithms.

BRIEF DESCRIPTION OF THE SEVERAL VIEWS OF THE DRAWINGS

Figure 1:
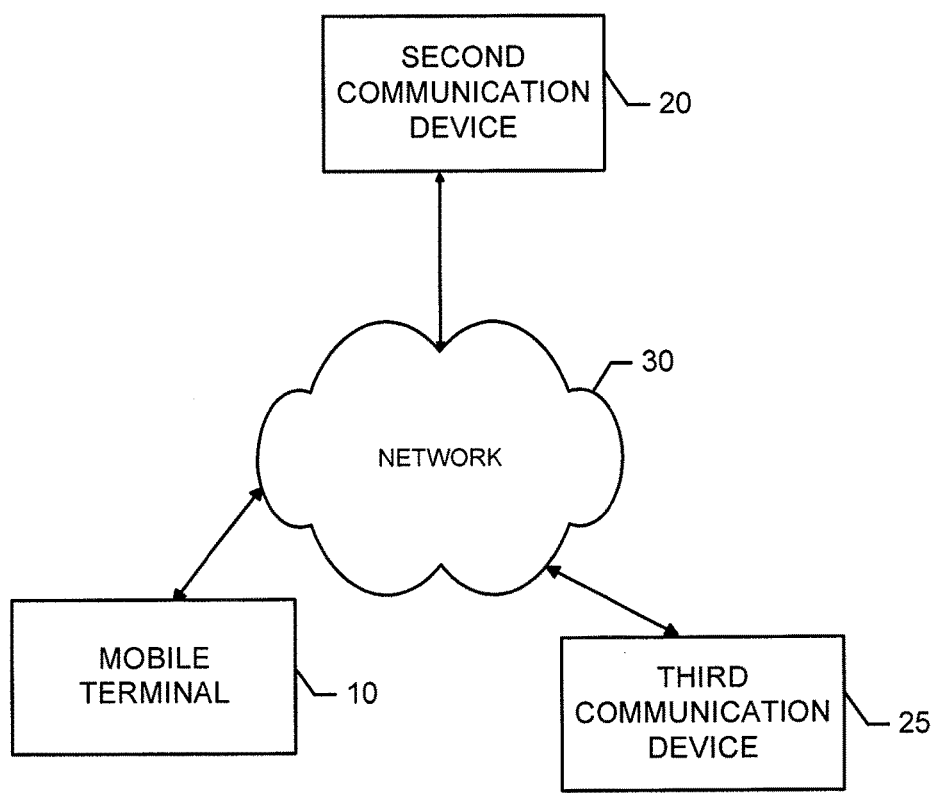
Figure 2:
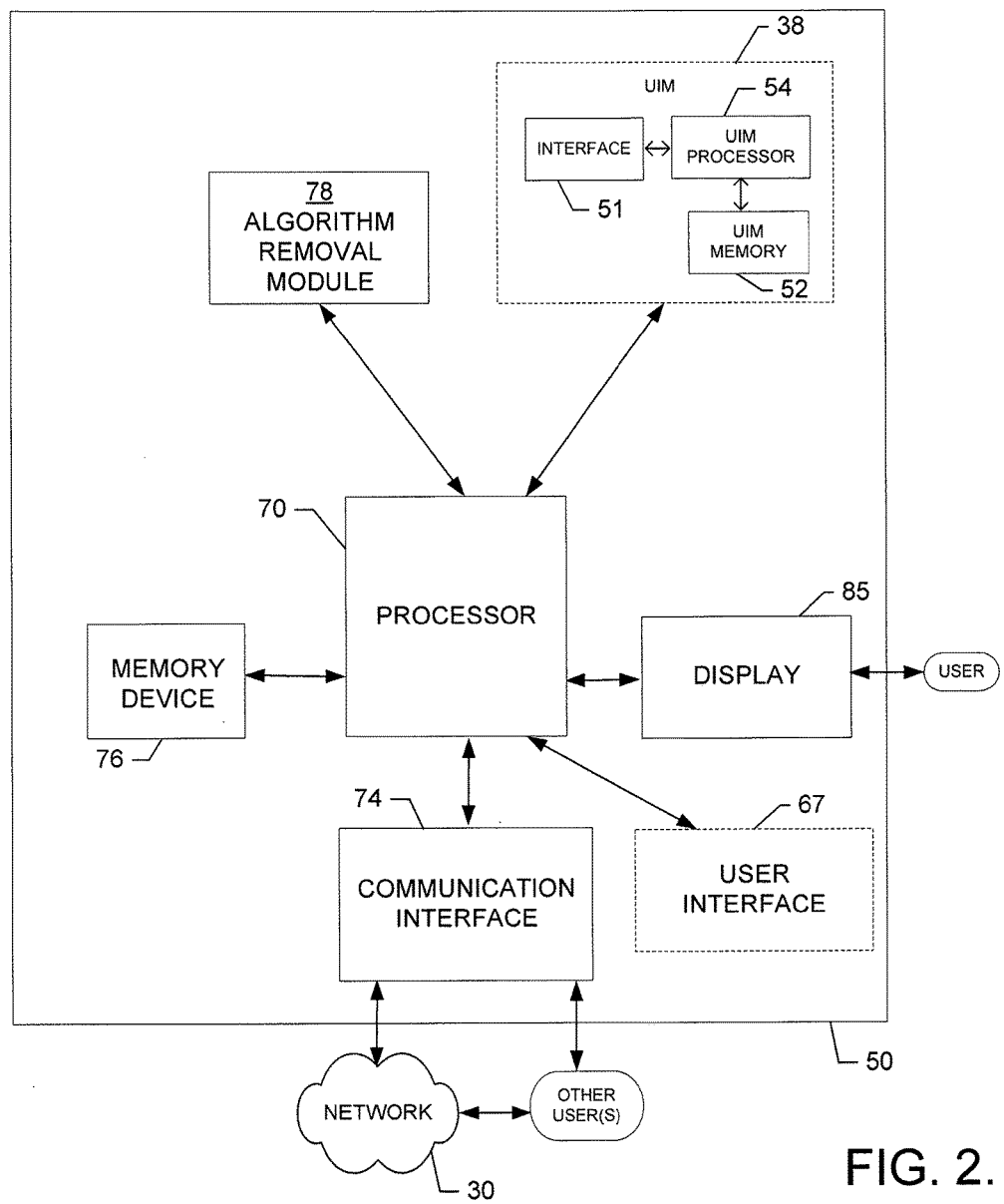
Figure 3:
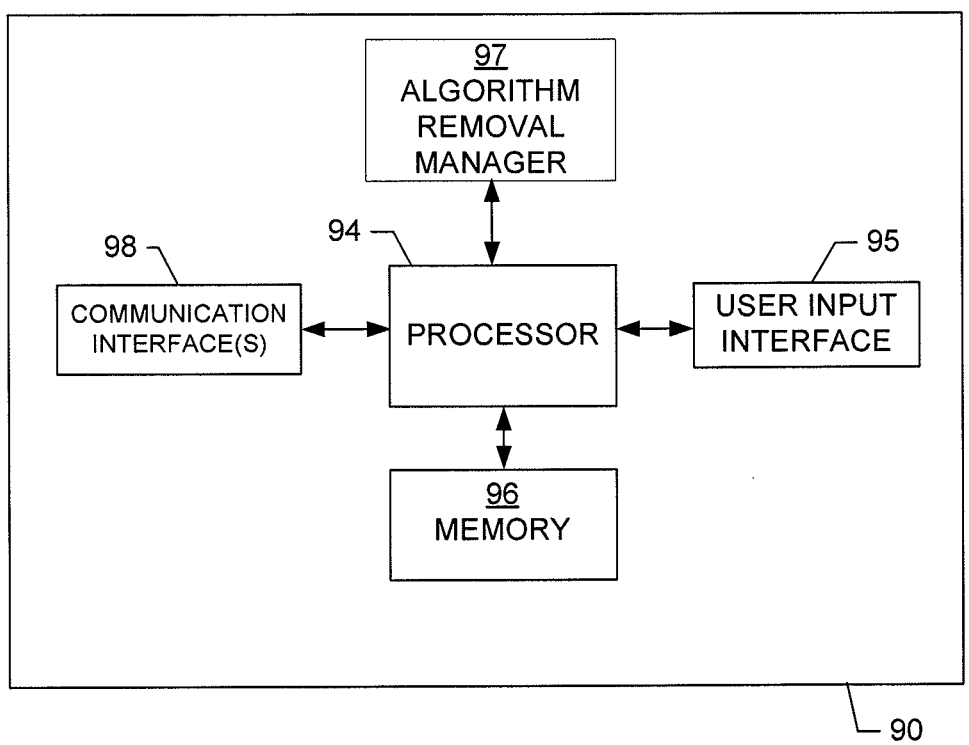
Figure 4:
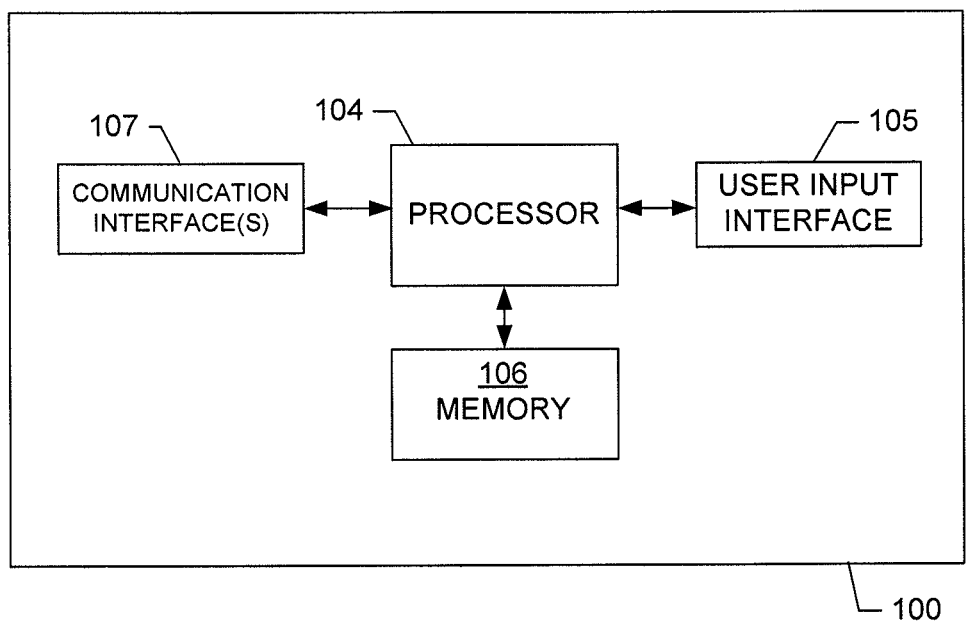
Figure 5:
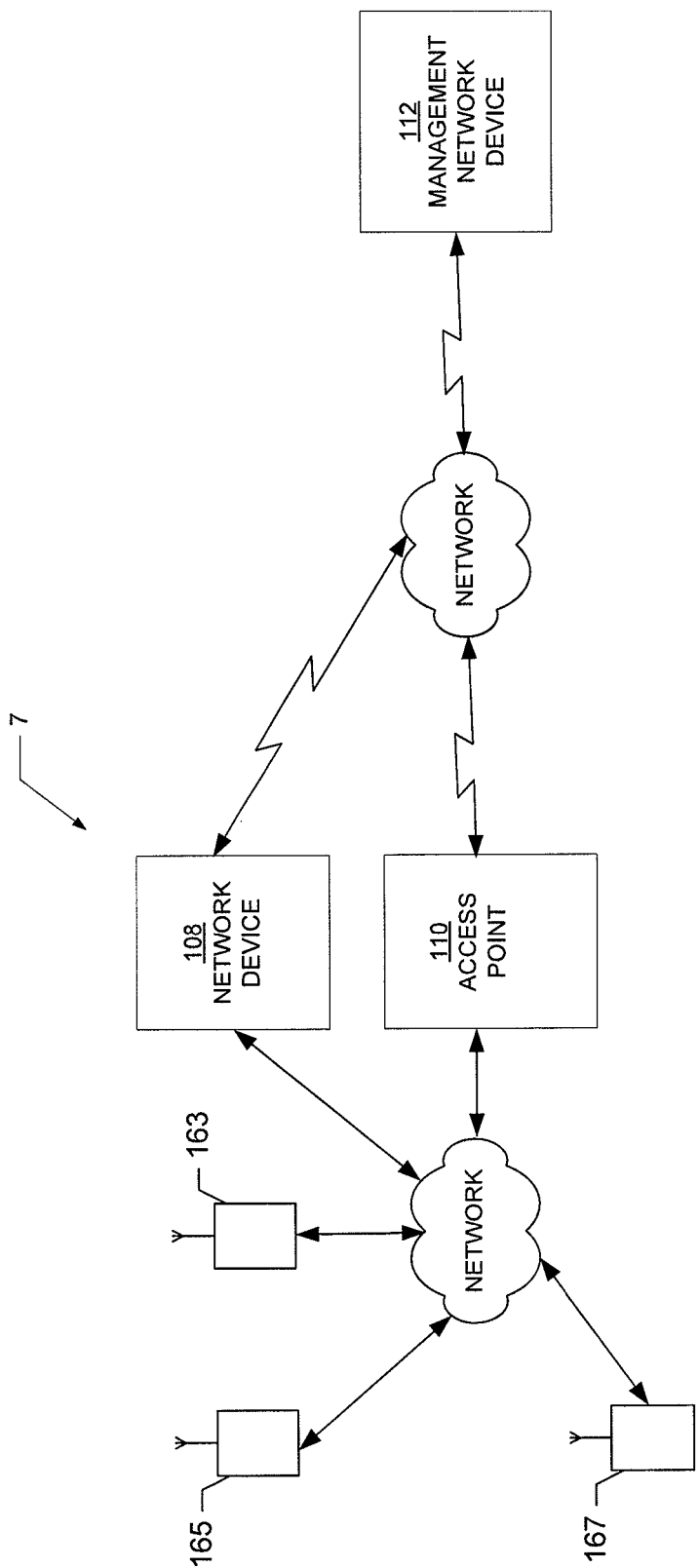
Figure 6:
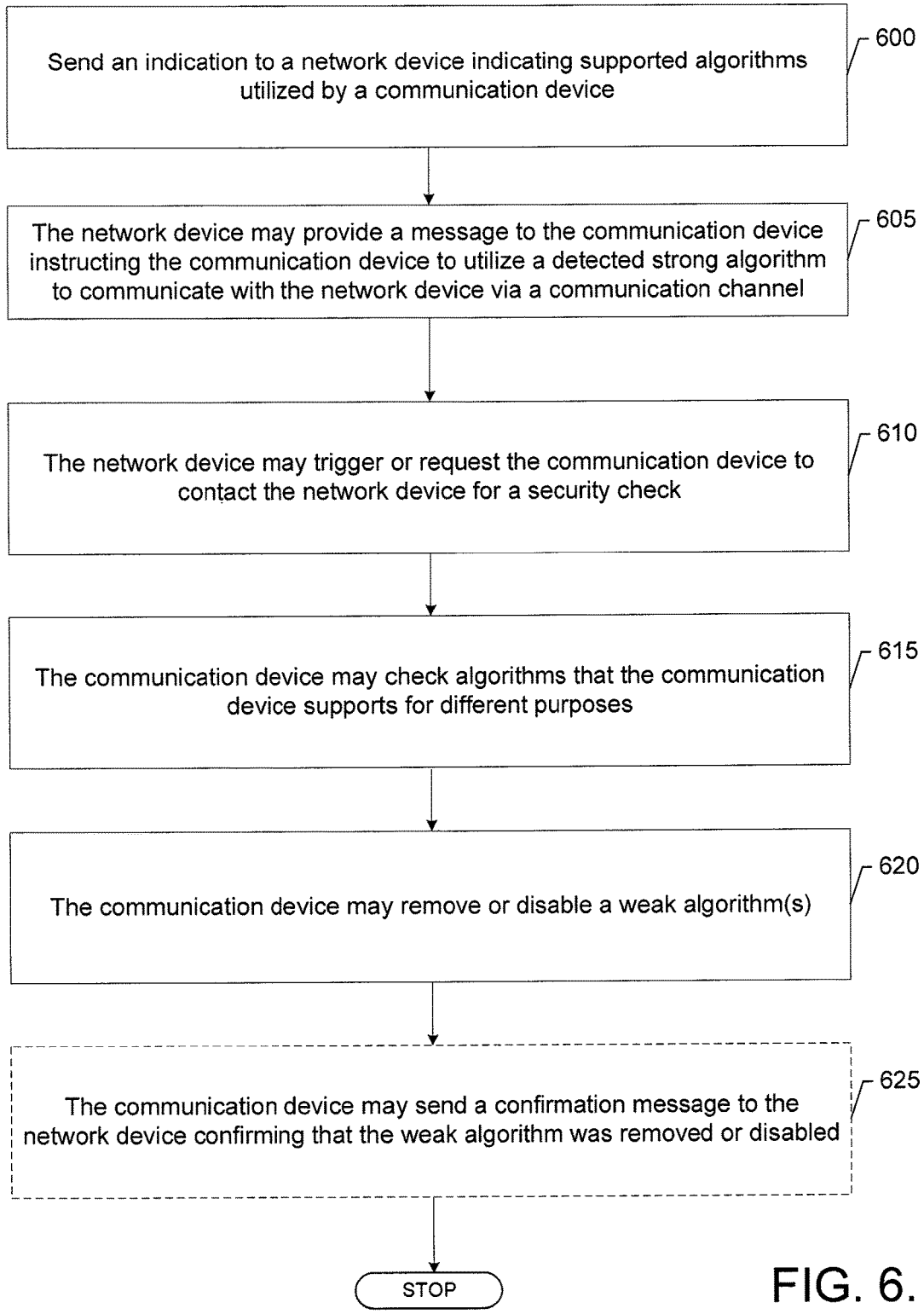
Figure 7:
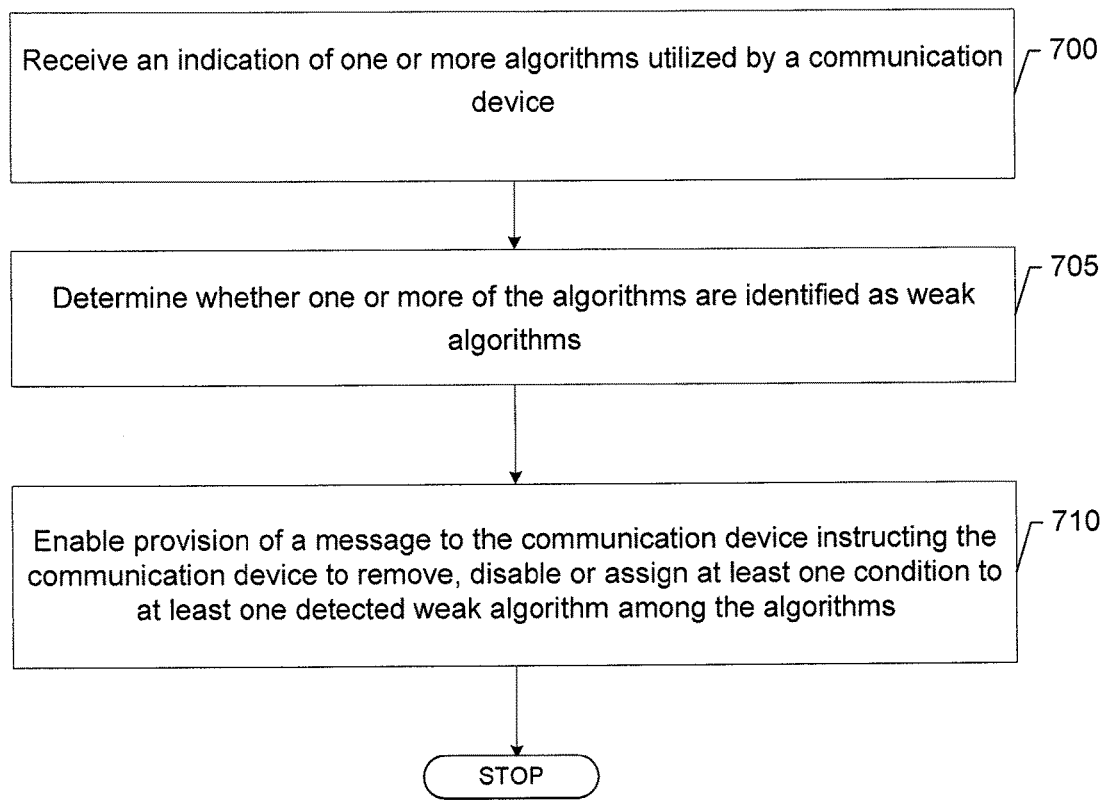

Having thus described some example embodiments of the invention in general terms, reference will now be made to the accompanying drawings, which are not necessarily drawn to scale, and wherein:

FIG. 1 is a schematic block diagram of a system according to an example embodiment of the invention;

FIG. 2 is a schematic block diagram of an apparatus according to an example embodiment of the invention;

FIG. 3 is a schematic block diagram of a network device according to an example embodiment of the invention;

FIG. 4 is a schematic block diagram of a network entity according to an example embodiment of the invention;

FIG. 5 is a schematic block diagram of a system according to an example embodiment;

FIG. 6 illustrates a flowchart for disabling or removing one or more algorithms according to an example embodiment of the invention; and FIG. 7 illustrates a flowchart for disabling or removing one or more algorithms according to another example embodiment of the invention.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein. Like reference numerals refer to like elements throughout. As used herein, the terms "data," "content," "information" and similar terms may be used interchangeably to refer to data capable of being transmitted, received and/or stored in accordance with embodiments of the invention. Moreover, the term "exemplary", as used herein, is not provided to convey any qualitative assessment, but instead merely to convey an illustration of an example. Thus, use of any such terms should not be taken to limit the spirit and scope of embodiments of the invention.

Additionally, as used herein, the term 'circuitry' refers to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical or tangible storage medium (for example, volatile or non-volatile memory device), may be differentiated from a "computer-readable transmission medium," which refers to an electromagnetic signal.

Also, as referred to herein, an algorithm(s) may be a set or subset of computer instructions that may be executed. In this regard, an algorithm(s) may include, but is not limited to a software application, computer code or a portion of a software application, or computer code. In an example embodiment, an algorithm(s) may have security and authentication features.

Additionally, as referred to herein a weak algorithm(s) may, but need not, denote an algorithm(s) that has a security (for example, a security level) that is unacceptable or in which the security is susceptible to being attacked.

FIG. 1 illustrates a generic system diagram in which a device such as a mobile terminal 10 is shown in an example communication environment. As shown in FIG. 1, an embodiment of a system in accordance with an example embodiment of the invention may include a first communication device (for example, mobile terminal 10) and a second communication device 20 capable of communication with each other via a network 30. In some cases, an embodiment of the invention may further include one or more additional communication devices, one of which is depicted in FIG. 1 as a third communication device 25. In one embodiment, not all systems that employ an embodiment of the invention may comprise all the devices illustrated and/or described herein. While an embodiment of the mobile terminal 10 and/or second and third communication devices 20 and 25 may be illustrated and hereinafter described for purposes of example, other types of terminals, such as sensors, metering devices (for example, electricity meters), traffic cameras, weather sensors, home eNode Bs (HeNBs) (for example, a Femtocell(s)), portable digital assistants (PDAs), pagers, mobile televisions, mobile telephones, gaming devices, laptop computers, cameras, video recorders, audio/video players, radios, global positioning system (GPS) devices, Bluetooth headsets, Universal Serial Bus (USB) devices or any combination of the aforementioned, and other types of voice and text communications systems, can readily employ an embodiment of the present invention. Furthermore, devices that are not mobile, such as servers and personal computers may also readily employ an embodiment of the invention.

The network 30 may include a collection of various different nodes (of which the second and third communication devices 20 and 25 may be examples), devices or functions that may be in communication with each other via corresponding wired and/or wireless interfaces. As such, the illustration of FIG. 1 should be understood to be an example of a broad view of certain elements of the system and not an all-inclusive or detailed view of the system or the network 30. Although not necessary, in one embodiment, the network 30 may be capable of supporting communication in accordance with any one or more of a number of First-Generation (1G), Second-Generation (2G), 2.5G, Third-Generation (3G), 3.5G, 3.9G, Fourth-Generation (4G) mobile communication protocols, Long Term Evolution (LTE), LTE advanced (LTE-A) and/or the like. In one embodiment, the network 30 may be a point-to-point (P2P) network.

One or more communication terminals such as the mobile terminal 10 and the second and third communication devices 20 and 25 may be in communication with each other via the network 30 and each may include an antenna or antennas for transmitting signals to and for receiving signals from a base site, which could be, for example a base station that is a part of one or more cellular or mobile networks or an access point that may be coupled to a data network, such as a Local Area Network (LAN), a Metropolitan Area Network (MAN), and/or a Wide Area Network (WAN), such as the Internet. In turn, other devices such as processing elements (for example, personal computers, server computers or the like) may be coupled to the mobile terminal 10 and the second and third communication devices 20 and 25 via the network 30. By directly or indirectly connecting the mobile terminal 10 and the second and third communication devices 20 and 25 (and/or other devices) to the network 30, the mobile terminal 10 and the second and third communication devices 20 and 25 may be enabled to communicate with the other devices or each other, for example, according to numerous communication protocols including Hypertext Transfer Protocol (HTTP) and/or the like, to thereby carry out various communication or other functions of the mobile terminal 10 and the second and third communication devices 20 and 25, respectively.

Furthermore, the mobile terminal 10 and the second and third communication devices 20 and 25 may communicate in accordance with, for example, radio frequency (RF), near field communication (NFC), Bluetooth (BT), Infrared (IR) or any of a number of different wireline or wireless communication techniques, including Local Area Network (LAN), Wireless LAN (WLAN), Worldwide Interoperability for Microwave Access (WiMAX), Wireless Fidelity (WiFi), Ultra-Wide Band (UWB), Wibree techniques and/or the like. As such, the mobile terminal 10 and the second and third communication devices 20 and 25 may be enabled to communicate with the network 30 and each other by any of numerous different access mechanisms. For example, mobile access mechanisms such as LTE, Wideband Code Division Multiple Access (W-CDMA), CDMA2000, Global System for Mobile communications (GSM), General Packet Radio Service (GPRS) and/or the like may be supported as well as wireless access mechanisms such as WLAN, WiMAX, and/or the like and fixed access mechanisms such as Digital Subscriber Line (DSL), cable modems, Ethernet and/or the like.

In an example embodiment, the first communication device (for example, the mobile terminal 10) may be a mobile communication device such as, for example, a wireless telephone or other devices such as a personal digital assistant (PDA), mobile computing device, camera, video recorder, audio/video player, positioning device, game device, television device, radio device, sensor, metering device, traffic camera, weather sensor, HeNB (for example, a Femtocell) or various other like devices or combinations thereof. The second communication device 20 and the third communication device 25 may be mobile or fixed communication devices. However, in one example, the second communication device 20 and the third communication device 25 may be servers, remote computers or terminals such as, for example, personal computers (PCs) or laptop computers.

In an example embodiment, the network 30 may be an ad hoc or distributed network arranged to be a smart space. Thus, devices may enter and/or leave the network 30 and the devices of the network 30 may be capable of adjusting operations based on the entrance and/or exit of other devices to account for the addition or subtraction of respective devices or nodes and their corresponding capabilities.

In an example embodiment, the mobile terminal as well as the second and third communication device 20 and 25 may employ an apparatus (for example, apparatus of FIG. 2) capable of employing an embodiment of the invention.

FIG. 2 illustrates a schematic block diagram of an apparatus for disabling or removing one or more weak algorithms according to an example embodiment of the invention. An example embodiment of the invention will now be described with reference to FIG. 2, in which certain elements of an apparatus 50 are displayed. The apparatus 50 of FIG. 2 may be employed, for example, on the mobile terminal 10 (and/or the second communication device 20 or the third communication device 25). Alternatively, the apparatus 50 may be embodied on a network device of the network 30. However, the apparatus 50 may alternatively be embodied at a variety of other devices, both mobile and fixed (such as, for example, any of the devices listed above). In some cases, an embodiment may be employed on a combination of devices. Accordingly, one embodiment of the invention may be embodied wholly at a single device (for example, the mobile terminal 10), by a plurality of devices in a distributed fashion (for example, on one or a plurality of devices in a P2P network) or by devices in a client/server relationship. Furthermore, it should be noted that the devices or elements described below may not be mandatory and thus some may be omitted in a certain embodiment.

Referring now to FIG. 2, the apparatus 50 may include or otherwise be in communication with a processor 70, an optional user interface 67, a communication interface 74, a memory device 76, a display 85, an optional user identify module (UIM) 38, and an algorithm removal module 78. The memory device 76 may include, for example, volatile and/or non-volatile memory. For example, the memory device 76 may be an electronic storage device (for example, a computer readable storage medium) comprising gates configured to store data (for example, bits) that may be retrievable by a machine (for example, a computing device like processor 70). In an example embodiment, the memory device 76 may be a tangible memory device that is not transitory. The memory device 76 may be configured to store information, data, files, applications (for example, algorithms), instructions or the like for enabling the apparatus to carry out various functions in accordance with an example embodiment of the invention. For example, the memory device 76 could be configured to buffer input data for processing by the processor 70. Additionally or alternatively, the memory device 76 could be configured to store instructions for execution by the processor 70. As yet another alternative, the memory device 76 may be one of a plurality of databases that store information and/or media content (for example, pictures, music, and videos).

The processor 70 may be embodied in a number of different ways. For example, the processor 70 may be embodied as one or more of various processing means such as a coprocessor, microprocessor, a controller, a digital signal processor (DSP), processing circuitry with or without an accompanying DSP, or various other processing devices including integrated circuits such as, for example, an ASIC (application specific integrated circuit), an FPGA (field programmable gate array), a microcontroller unit (MCU), a hardware accelerator, a special-purpose computer chip, or the like. In an example embodiment, the processor 70 may be configured to execute instructions stored in the memory device 76 or otherwise accessible to the processor 70. As such, whether configured by hardware or software methods, or by a combination thereof, the processor 70 may represent an entity (for example, physically embodied in circuitry) capable of performing operations according to an embodiment of the invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and operations described herein when the instructions are executed. However, in some cases, the processor 70 may be a processor of a specific device (for example, a mobile terminal or network device) adapted for employing an embodiment of the invention by further configuration of the processor 70 by instructions for performing the algorithms and operations described herein. The processor 70 may include, among other things, a clock, an arithmetic logic unit (ALU) and logic gates configured to support operation of the processor 70.

In an example embodiment, the processor 70 may be configured to operate a connectivity program, such as a browser, Web browser or the like. In this regard, the connectivity program may enable the apparatus 50 to transmit and receive Web content, such as for example location-based content or any other suitable content, according to a Wireless Application Protocol (WAP), for example.

Meanwhile, the communication interface 74 may be any means such as a device or circuitry embodied in either hardware, a computer program product, or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network (for example, network 30). In fixed environments, the communication interface 74 may alternatively or also support wired communication. As such, the communication interface 74 may include a communication modem and/or other hardware/software for supporting communication via cable, digital subscriber line (DSL), universal serial bus (USB), Ethernet or other mechanisms.

The optional user interface 67 may be in communication with the processor 70 to receive an indication of a user input at the user interface 67 and/or to provide an audible, visual, mechanical or other output to the user. As such, the user interface 67 may include, for example, a keyboard, a mouse, a joystick, a display, a touch screen, a microphone, a speaker, or other input/output mechanisms. In an example embodiment in which the apparatus is embodied as a server or some other network devices, the user interface 67 may be limited, remotely located, or eliminated. The processor 70 may comprise user interface circuitry configured to control at least some functions of one or more elements of the user interface, such as, for example, a speaker, ringer, microphone, display, and/or the like. The processor 70 and/or user interface circuitry comprising the processor 70 may be configured to control one or more functions of one or more elements of the user interface through computer program instructions (for example, software and/or firmware) stored on a memory accessible to the processor 70 (for example, memory device 76, and/or the like).

In an example embodiment, the processor 70 may be embodied as, include or otherwise control the algorithm removal module. The algorithm removal module 78 may be any means such as a device or circuitry operating in accordance with software or otherwise embodied in hardware or a combination of hardware and software (for example, processor 70 operating under software control, the processor 70 embodied as an ASIC or FPGA specifically configured to perform the operations described herein, or a combination thereof) thereby configuring the device or circuitry to perform the corresponding functions of the algorithm removal module 78 as described below. Thus, in an example in which software is employed, a device or circuitry (for example, the processor 70 in one example) executing the software forms the structure associated with such means.

In an example embodiment, the algorithm removal module 78 may communicate with a network device (for example, network device 90 of FIG. 3) and may provide the network device with an indication (for example, a list) of the algorithms supported and utilized by the apparatus 50. In response to receipt of the indication, the network device may determine whether any of the algorithms utilized by the apparatus 50 are weak algorithms (for example, a less secure algorithm(s)). In an instance in which the network device identifies one or more weak algorithms of the apparatus 50, the network device may send a message to the algorithm removal module 78 instructing the algorithm removal module 78 to remove or disable the weak algorithms. In response to receipt of the message from the network device, (for example, this message may be in the form of a specific sequence of challenges as input to the algorithm to be disabled, the output is decoded as the removal message) the apparatus removal module 78 may remove or disable the weak algorithms of the apparatus 50. In this regard, the apparatus 50 may utilize a strong algorithm (for example, a more secure algorithm(s)) specified by the network device, as described more fully below.

The apparatus 50 may further include an optional UIM 38. The UIM 38 may include a memory device (for example, UIM memory 52), a processor (for example, UIM processor 54) and an interface 51 configured to communicate with the processor 70 or other devices. The UIM 38 may be an example of a smart card and may include, for example, a Subscriber Identity Module (SIM), an Integrated Circuit Card (ICC), a Universal Integrated Circuit Card (UICC), a Universal Subscriber Identity Module (USIM), or a Removable User Identity Module (R-UIM). When the UIM 38 is an R-UIM, the UIM 38 may be removable from the apparatus 50. In one example embodiment in the context of GSM and UMTS applications, for example, when the UIM 38 is a UICC, the UICC may include a Subscriber Identity Module (SIM) application, Universal SIM (USIM) application, Internet Protocol Multimedia Services Identity Module (ISIM) application or the like for accessing corresponding Public Land Mobile Networks (PLMNs), although it should be understood that one or more of these applications may also be used to access one or more other networks.

The memory 52 of the UIM 38 may store information elements related to a mobile subscriber and any other suitable data. For instance, the memory of the UIM 38 may store information elements (for example, a PIN code) related to and/or for validating a mobile subscriber to a network operator and/or to the apparatus 50. In this regard, content of the UIM 38 may not be accessible until the mobile subscriber is validated.

Additionally, the UIM 38 may store applications (for example, algorithms) and in some cases the processor 54 of the UIM 38 may execute the applications and issue or respond to commands. In one example embodiment, the processor 54 of the UIM 38 may perform functions analogous to the algorithm removal module 78 described herein to remove or disable one or more weak algorithms that may be stored in UIM memory 52 or another memory (for example, memory device 76).

For example, in an example embodiment, the processor 54 of the UIM 38 may communicate with a network device (for example, network device 90 of FIG. 3) and may provide the network device with an indication (for example, a list) of the algorithms supported and utilized by the UIM 38. In response to receipt of the indication, the network device may determine whether any of the algorithms utilized by the UIM 38 which are supported by the network device are weak algorithms. The network device may send a message to the processor 54 of the UIM 38 instructing the processor 54 to remove or disable the weak algorithms. In response to receipt of the message from the network device, the processor 54 may remove or disable the weak algorithms of the UIM 38. In this regard, the processor 54 of the UIM 38 may utilize a strong algorithm specified by the network device to facilitate communications with the network device.

Referring now to FIG. 3, a block diagram of a network device according to an example embodiment is provided. As shown in FIG. 3, the network device 90 (for example, a server, a base station, an access point (AP) (for example, a WLAN AP, or a WiFi AP)) may include a processor 94, a memory 96, a user input interface 95, a communication interface(s) 98, and an algorithm removal manager 97. The memory 96 may comprise volatile and/or non-volatile memory, and may store content, data and/or the like. The memory 96 may store client applications (for example, algorithms), instructions, and/or the like for the processor 94 to perform the various operations of the network device 90. The memory 96 may be a tangible non-transitory device.

The processor 94 may be embodied in a number of different ways. For instance, the processor 94 may be embodied as one or more of various processing means such as a coprocessor, microprocessor, a controller, a DSP, processing circuitry with or without an accompanying DSP, or various other processing devices including integrated circuits such as, for example, an ASIC, an FPGA, a MCU, a hardware accelerator, a special-purpose computer chip, or the like. In an example embodiment, the processor 94 may be configured to execute instructions stored in the memory 96 or otherwise accessible to the processor 94. As such, whether configured by hardware or software methods, or by a combination thereof, the processor 94 may represent an entity (for example, physically embodied in circuitry) capable of performing operations according to an embodiment of the invention while configured accordingly. Thus, for example, when the processor 94 is embodied as an ASIC, FPGA or the like, the processor 94 may be specifically configured hardware for conducting the operations described herein.

Alternatively, as another example, when the processor 94 is embodied as an executor of software instructions, the instructions may specifically configure the processor 94 to perform the algorithms and operations described herein when the instructions are executed. However, in some cases, the processor 94 may be a processor of a specific device (for example, a mobile terminal or network device) adapted for employing an embodiment of the invention by further configuration of the processor 94 by instructions for performing the algorithms and operations described herein. The processor 94 may include, among other things, a clock, an arithmetic logic unit (ALU) and logic gates configured to support operation of the processor 94.

The processor 94 may also be connected to a communication interface 98 or other means for displaying, transmitting and/or receiving data, content, and/or the like. The user input interface 95 may comprise any of a number of devices allowing the network entity to receive data from a user, such as a keypad, a touch display, a joystick or other input device. In this regard, the processor 94 may comprise user interface circuitry configured to control at least some functions of one or more elements of the user input interface. The processor and/or user interface circuitry of the processor may be configured to control one or more functions of one or more elements of the user interface through computer program instructions (for example, software and/or firmware) stored on a memory accessible to the processor (for example, volatile memory, non-volatile memory, and/or the like).

In an example embodiment, the processor 94 may be embodied as, include or otherwise control the algorithm removal manager 97. The algorithm removal manager 97 may be any means such as a device or circuitry operating in accordance with software or otherwise embodied in hardware or a combination of hardware and software (for example, processor 94 operating under software control, the processor 94 embodied as an ASIC or FPGA specifically configured to perform the operations described herein, or a combination thereof) thereby configuring the device or circuitry to perform the corresponding functions of the conflicts manager 97 as described below. Thus, in an example in which software is employed, a device or circuitry (for example, the processor 94 in one example) executing the software forms the structure associated with such means.

The algorithm removal manager 97 may receive an indication (for example, a list) of one or more algorithms utilized by apparatus 50. In an example embodiment, the algorithm removal manager 97 may receive the indication of the algorithms utilized by the apparatus 50 periodically (for example, in an instance in which the apparatus 50 registers with the network 30, daily, weekly, or monthly.) In response to receipt of the indication, the algorithm removal manager 97 may analyze the algorithms and may determine whether any of the algorithms are weak algorithms (for example, unsecure algorithms (for example, outdated or obsolete algorithms)). The algorithm removal manager 97 may also determine whether any of the algorithms are strong algorithms that are supported by the network device 90. The algorithm removal module 97 may send the apparatus 50 a message instructing the module 78, or processor 54 of the UIM 38, to disable or remove the weak algorithm(s) and may instruct the algorithm removal module 78, or the processor 54 of the UIM 38 to execute an algorithm supported by the network device 90 that the algorithm removal manager 97 determines is a strong algorithm. Alternatively, the algorithm removal module 97 may instruct the algorithm removal module 78, or the processor 54 of the UIM 38 to execute the strong algorithm and instead of removing the weak algorithm(s), the algorithm removal manager 97 may instruct the algorithm removal 78, or the processor 54 of the UIM 38 to update a weak algorithm to produce a stronger algorithm based on data that the algorithm removal manager 97 sends to the apparatus 50.

Referring now to FIG. 4, a block diagram of an example embodiment of a network entity is provided. As shown in FIG. 4, the network entity 100 (also referred to herein as management network device 100) (for example, a management server) may include a processor 104 and a memory 106. The memory 106 may comprise volatile and/or non-volatile memory, and may store content, data and/or the like. The memory 106 may store client applications (for example algorithms), instructions, and/or the like for the processor 94 to perform the various operations of the network entity. The memory 106 may be a tangible non-transitory device.

The processor 104 may also be connected to a communication interface 107 or other means for displaying, transmitting and/or receiving data, content, and/or the like. The user input interface 105 may comprise any of a number of devices allowing the network entity 100 to receive data from a user, such as a keypad, a touch display, a joystick or other input device. In this regard, the processor 104 may comprise user interface circuitry configured to control at least some functions of one or more elements of the user input interface. The processor and/or user interface circuitry of the processor may be configured to control one or more functions of one or more elements of the user interface through computer program instructions (for example, software and/or firmware) stored on a memory accessible to the processor (for example, volatile memory, non-volatile memory, and/or the like).

The network entity 100 may receive data from the network device 90 specifying one or more algorithms being utilized by one or more apparatuses 50. In response to receipt of the indication, the processor 104 of the network entity may determine whether any of the algorithms are weak. In an instance in which the processor 104 determines that one or more of the algorithms are weak, the processor 104 may send the apparatus 50 a message that includes data instructing the apparatus 50 to remove or disable the weak algorithms. The message may also include data instructing the apparatus to execute a strong algorithm that is supported by the network entity and the apparatus 50.

Referring now to FIG. 5, a diagram of a system according to an example embodiment is provided. The system 7 may include communication devices 163, 165, and 167 (for example, apparatuses 50), a network device 108 (for example, a network device 90), an access point 110 (for example, a network device 90), and a management network device 112 (for example, network entity 100). Although FIG. 5 shows that system 7 includes three communication devices 163, 165, 167, one network device 108, one access point 110 and one management network device 112, it should be pointed out that system 7 may include any suitable number of communication devices 163, 165, 167, network devices 108, access points 110 and management network devices 112 without departing from the spirit and scope of the invention.

In one example embodiment, the network device 108 may receive an indication(s) from a communication device(s) (for example, communication device 163) indicating algorithms utilized by the communication device(s). The network device 108 may analyze the algorithms and may determine whether any of the algorithms are weak (for example, the security algorithms are susceptible to being broken). In response to identifying one or more weak algorithms, the network device 108 may send a message to the communication device instructing the communication device to disable or remove the weak algorithm(s) and to execute a strong algorithm supported by the network device and the communication device, as described more fully below. In an example embodiment, in instance in which a weak algorithm is disabled, but not removed, by the communication device, the network device 108 may update the weak algorithm to be more secure while the communication device is executing the strong algorithm (for example, to exchange data with the network device).

In one example embodiment, the network device 108 may disable algorithms on a stolen communication device (for example, communication device 165) remotely. In this regard, the network device 108 may disable or remove all of the algorithms on the stolen communication device.

The network device 108 may determine that a communication device is stolen based on the user/subscriber of the communication device reporting that the communication device is stolen. Alternatively, the network device 108 may determine that the communication device is stolen based on detecting abnormal behavior of the communication device (for example, detecting excessive monetary charges for services in a foreign country).

In another example embodiment, in response to receiving the indication(s) (for example, a list) from the communication device (for example, communication device 163) indicating the algorithms utilized by the communication device, the network device 108 may send a request to the management network device 112 identifying the algorithms. The request may include data requesting the management network device 112 to determine whether any of the algorithms are weak. In response to determining that one or more of the algorithms are weak, the management network device 112 may instruct the communication device(s) to disable or remove weak algorithms. In this regard, the communication device (for example, communication device 163) may not necessarily require user interaction at the communication device to disable or remove an algorithm(s). The management network device 112 may also instruct the communication device (for example, communication device 163) to execute a strong algorithm supported by the management network device 112 which the communication device indicated that it also supported when providing the indication(s) (for example, the list) to the network device 108.

In an alternative example embodiment, the access point 110 (for example, a WLAN AP) may perform a security scan and in response to the security scan the access point 110 may receive an indication(s) (for example, a list) from a communication device (for example, communication device 163) of the algorithms utilized and supported by the communication device. In response to receipt of the indication(s), the access point 110 may, but need not, send a request to the management network device 112 identifying the algorithms and the request may include information requesting the management network device 112 to determine whether any of the algorithms are weak. In an instance in which the management network device 112 determines that one or more of the algorithms are weak, the management network device 112 may instruct the communication device(s) to disable or remove weak algorithms. The management network device 112 may also instruct the communication device to execute a strong algorithm supported by the management network device 112 and the communication device. The strong algorithm(s) may be one of the algorithm(s) that the communication device indicated that it also supported when communicating with the access point 110 in response to the security scan.

Referring now to FIG. 6, a flowchart of an example method of disabling or removing algorithms from a communication device is provided. At operation 600, a communication device (for example, communications device 163) may send an indication(s) (for example, a list) of supported algorithms (for example, security algorithms (for example, cryptographic algorithms)) utilized by the communication device to a network device (for example, network device 108). The network device may determine whether one or more of the algorithms are weak, as described more fully below. The network device may also determine whether one or more of the algorithms are strong.

At operation 605, the network device may provide a message to the communication device instructing the communication device to utilize a detected strong algorithm for facilitating communications with the network device via a communication channel. The strong algorithm (for example, more secure algorithm) may be one of the algorithms indicated as being supported by the communication device. In this regard, the network device may instruct the communication device to execute the strong algorithm. At operation 610, the network device may trigger or request the communication device to contact the network device for a security check. In response to receipt of the request, the communication device may provide the security protocols for the algorithms (for example, the list of algorithms) that the communication device supports to the network device. The network device may analyze the security protocols of the algorithms and may determine whether corresponding algorithms are strong or weak.

Alternatively, the network device may determine a weak algorithm based on analyzing the received indication(s) (for example, the list of algorithms) of the algorithms supported by the communication device and may issue a remote command to the communication device to disable a detected weak algorithm(s). The command may be strongly authorized, for example, with a long shared secret key (for example, a long password) or based on a Public Key Infrastructure (PKI) and the integrity of the command may be protected. The remote command provided to the communication device by the network device may indicate one or more weak algorithms.

In one example embodiment, the algorithm removal manager (for example, algorithm removal manager 97) of the network device may (for example, remotely) update a weak algorithm(s) utilized by the communication device. In an alternative example embodiment, the network device may request a management network device (for example, management network device 112) to remove or disable a weak algorithm(s) from the communication device or to update a weak algorithm of the communication device.

In response to receiving the command, an algorithm removal module (for example, algorithm removal module 78) or a processor (for example, processor 54) of a UIM of the communication device may validate the security and correctness of the command. The algorithm removal module or the processor of the UIM of the communication device may determine the security of the command based in part on identifying a shared secret key or public key utilized for security authorization with the network device. The communication device may analyze a file indicting which operators are allowed to send a remote command to the communication device. In an instance in which the communication device determines that the command is not received from an approved operator identified in the file, the communication device may determine that the command is unsecure and unauthorized. The file may be stored in a memory (for example, memory device 76) of the communication device or in a UIM (for example, stored in UIM memory 52) of the communication device.

At operation 615, the communication device may check algorithms that the communication device supports for different purposes. For example, some of the algorithms that the device supports may be utilized for radio security and some other algorithms may be utilized for other purposes such as browser security. For instance, in an instance in which a browser is launched, browser security algorithms may be executed by the communication device. The radio security and browser security algorithms are examples and as such the communication device may check and utilize any other suitable algorithms for other purposes (for example, authentication).

At operation 620, the weak algorithm(s) (for example, specified in the command) identified by the network device may be removed or disabled from the supported algorithms (for example, from the list of supported algorithms) of the communication device. In an example embodiment, the network device may instruct the communication device to disable/remove the weak algorithm(s) in an instance in which there is at least one strong algorithm for usage by the communication device. In one example embodiment, in an instance in which the communication device currently only supports a weak algorithm(s), the weak algorithm(s) may not be disabled or removed to allow the communication device to utilize the weak algorithm for communication with the network device.

In an alternative example embodiment, the weak(s) algorithm(s) may not necessarily be removed or disabled. Instead, the network device may place some condition(s) on the weak algorithm(s) (for example, a condition to utilize the weak algorithm(s) only for WLAN communications).

In some example embodiments, an algorithm determined to be weak, may be implemented in hardware. As such, the algorithms implemented in hardware may not be easily removable or updatable (for example, via software). In this regard, the network device may send a flag to the communication device to specify whether the algorithm(s) implemented in hardware should be enabled or disabled. The flag may include a bit utilized to denote whether the algorithm(s) should be enabled or disabled. In response to receiving the flag, the communication device may store the bit of the flag in memory (for example, memory device 76, UIM memory 52).

Optionally, at operation 625, the communication device may send a confirmation message to the network device confirming that the weak algorithm(s) was removed or disabled from the communication device. Additionally or alternatively, at a subsequent time, the network device may send the communication device a message to check whether the weak algorithm(s) is disabled or removed. In this regard, the communication device may inform the network device of the strong algorithms that the communication device may utilize and since no weak algorithm(s) may be identified, the network device may determine that the weak algorithm(s) is disabled or removed.

In an alternative example embodiment, one or more algorithms may disable or remove themselves by performing self-de-activation. In this regard, an algorithm(s) (for example, an authentication algorithm) may have a determined output that is based on an input and a key (for example, a shared key). Instead of the network device sending a command with a fixed sequence to remove an entire algorithm(s) from a communication device, the network device may send a message consisting of an input challenge (for example, input data (for example, authentication input data)) to be used with a corresponding key (for example, the shared key) in a communication device, which may trigger the algorithm(s) to produce one or more sequence output values. In response to the algorithm removal module or the UIM processor executing the algorithm(s) (for example, a weak algorithm(s)), the algorithm(s) may detect the output values and may determine that the output values signify to disable or remove the algorithm(s). In this regard, the algorithm may remove or disable itself in response to detecting the output values.

The output values that denote or signify that an algorithm(s) should be removed or disabled may be pre-configured (for example, by a communication device) in an execution environment of the algorithm(s). In an example embodiment, an algorithm(s) may automatically disable itself in an instance in which a predefined number of consecutive output values have occurred. The predetermined number of consecutive output values may occur in response to executing the input received from the network device using the key related to the algorithm for computing the output. The network device may ensure that the probability that the output values occur in a consecutive sequence during normal operation is kept low in order not to trigger this to happen in normal operation. In other words, the sequence has to have a very low probability to statistically occur during normal operation. The pattern in which an algorithm(s), being executed by an algorithm removal module or a UIM processor of an UIM, may determine that the algorithm(s) is to be disabled/removed may vary.

For purposes of illustration and not of limitation, instead of a number of consecutive output values to detect whether an algorithm(s) should be disabled/removed, two consecutive values followed by one (or another specified number of) random value followed by a predefined value may be utilized, as an example, to determine whether an algorithm(s) should be disabled. In this example, the algorithm(s) being executed may analyze three defined values occurring in a specific order. In an alternative example embodiment, an algorithm(s), being executed by an algorithm removal module or a UIM processor of a UIM, may analyze any suitable order of the output values (for example, consecutive output values) rather than analyzing a defined order. For example, in an instance in which there are two consecutive predefined output values, a number of random values may follow one of the predefined values which may be followed by one or more random values that may be followed by another of the predefined values. In this regard, the output values may include a sequence of interleaved predetermined values and random values. As such, an example embodiment may allow any suitable variants or combinations of output values to be utilized.

A benefit of this approach is that the output values may be returned as normal verification values (for example, authentication verification values to the network device. In this regard, a network device (for example, network device 108) may be able to determine an instance in which an algorithm(s) has been disabled or removed based on the returned values and a sequence of the returned values being provided to the network device by a corresponding communication device (for example, communication device 163). This approach may allow disabling of the algorithm(s) to look like normal operation (for example, a normal authentication process) based on observing the algorithm(s) externally. As such, an eavesdropper may not be able to distinguish between a normal authentication process or a process of disabling an algorithm(s).

In one example embodiment, the self-de-activation approach of disabling algorithms may also be used on certificates. In this regard, an algorithm removal module or a UIM processor of a UIM of a communication device may check a sequence of certificates that have been verified. For instance, a communication device may have several pre-stored certificates or shared secret keys which may act as device certificates or operator certificates (for example, for the purpose of authorization and confidentiality) and each of the certificates may sign(s)/bind(s) a key(s) for a certain algorithm(s). In an instance in which a corresponding algorithm(s) is determined to be weak, the certificates may be disabled or removed instead of the algorithm(s). Alternatively, the certificates of the algorithm determined to be weak may be disabled or removed as part of the algorithm being disabled.

The system 7 may allow different approaches to be utilized to disable or remove one or more algorithms. For instance, as described above, one approach may be to define a "fixed input" for one or more algorithms in which there may be a specific output to be pre-configured for respective communication devices (for example, communication devices 163, 165, 167) of the system 7. The output of the algorithms may depend on a key used together with an input challenge (for example, authentication input data) from a network device (for example, network device 108). Another approach may be for the algorithm(s) to utilize a "fixed output" to determine whether the algorithm(s) should be disabled or removed. In this regard, each communication device may require a specific set of input challenges (for example, authentication inputs) to disable or remove an algorithm(s). An alternative example embodiment, may allow the "fixed input" and "fixed output" approaches to be combined in one scheme.

In this regard, one or more disable sequence values (also referred to herein as response values) may be provided by an algorithm(s) (for example, a weak algorithm) of a communication device to a network device. The network device may analyze the disable sequence values to determine that the algorithm is disabled or removed. The disable sequence values may not necessarily reach the network device (for example, a verification entity) and therefore an algorithm(s) (for example, a weak algorithm) may be disabled even if no response is received from the corresponding algorithm(s) of the communication device. The disable sequence values may be detected by the network device at a next authentication run which may fail. In one example embodiment, an algorithm(s) being disabled may still provide a response to the network device by utilizing a fixed known key, or by producing a fixed output that is not considered as a valid output. In an instance in which an authentication input may not reach the network device, receipt of a next authentication value may reset the detection scheme to enable a disable sequence to be initiated. The authentication value is a value that the network device may expect when an algorithm is still fully functional. As such, the network device may know that the algorithm is still in operation as that this returned value represents a valid response to an input challenge using a corresponding key and the algorithm that should have been removed.

Referring now to FIG. 7, an example embodiment of a flowchart for disabling or removing one or more weak algorithms is provided. At operation 700, a network device (for example, network device 108 (for example, network device 90)) may include means, such as the algorithm removal manger 97, the processor 94 and/or the like, for receiving an indication of one or more algorithms utilized by a communication device (for example communication device 163 (for example, apparatus 50)). At operation 705, the network device may include means, such as the algorithm removal manager 97, the processor 94 and/or the like, for determining whether one or more of the algorithms are identified as a weak algorithm. In one example embodiment, weak algorithms may be less secure algorithms relative to strong algorithms. At operation 715, the network device may include means, such as the algorithm removal manager 97, the processor 94 and/or the like, for enabling provision of a message (for example, a command) to the communication device instructing the communication device to remove, disable or assign at least one condition to at least one detected weak algorithm among the algorithms.

It should be pointed out that FIGS. 6 and 7 are flowcharts of a system, method and computer program product according to an example embodiment of the invention. It will be understood that each block of the flowcharts, and combinations of blocks in the flowcharts, can be implemented by various means, such as hardware, firmware, and/or a computer program product including one or more computer program instructions. For example, one or more of the procedures described above may be embodied by computer program instructions. In this regard, in an example embodiment, the computer program instructions which embody the procedures described above are stored by a memory device (for example, memory device 76, memory 96, memory 106) and executed by a processor (for example, processor 70, processor 94, processor 104, algorithm removal module 78, algorithm removal manager 97). As will be appreciated, any such computer program instructions may be loaded onto a computer or other programmable apparatus (for example, hardware) to produce a machine, such that the instructions which execute on the computer or other programmable apparatus cause the functions specified in the flowcharts blocks to be implemented. In one embodiment, the computer program instructions are stored in a computer-readable memory that can direct a computer or other programmable apparatus to function in a particular manner, such that the instructions stored in the computer-readable memory produce an article of manufacture including instructions which implement the function(s) specified in the flowcharts blocks. The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowcharts blocks.

Accordingly, blocks of the flowcharts support combinations of means for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In an example embodiment, an apparatus for performing the methods of FIGS. 6 and 7 above may comprise a processor (for example, the processor 70, processor 94, processor 104, algorithm removal module 78, algorithm removal manager 97) configured to perform some or each of the operations (600-625, 700-715) described above. The processor may, for example, be configured to perform the operations (600-625, 700-715) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (600-625, 700-715) may comprise, for example, the processor 70 (for example, as means for performing any of the operations described above), the processor 94, the processor 104, the algorithm removal module 78, the algorithm removal manager 97 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:

receiving, at a network management device, an indication of one or more cryptographic modules each implementing a cryptographic algorithm residing on a communication device;

determining, at the network management device, whether a cryptographic module of the one or more cryptographic modules is identified as a weak cryptographic module, wherein the weak cryptographic module is at least susceptible to a security breach;

generating, at the network management device, a message that comprises at least one shared key and input challenge data and that, when processed by the weak cryptographic module, results in the generation of predefined output values that signify that the weak cryptographic module should remove or disable itself;

instructing, by the network management device, the communication device to execute the detected weak cryptographic module to process the message comprising the at least one shared key and the input challenge data, wherein the weak cryptographic module removes or disables itself in response to detecting that its generated output values comprise the predefined output values; and determining, by the network management device, that the weak cryptographic module has been removed or disabled based on receiving an authentication value from an authentication attempt with the communication device that produces an invalid response.

2. The method of claim 1, wherein prior to enabling provision of the message, the method further comprises:

instructing the communication device to execute a detected first strong cryptographic module of the one or more cryptographic modules to facilitate communications with a network device, wherein the first strong cryptographic module prevents at least a security breach.

3. The method of claim 1, further comprising:

requesting a network entity to update the detected weak cryptographic module in response to determining that the communication device executes a detected strong cryptographic module to communicate with the network device, wherein the detected strong cryptographic module prevents at least a security breach.

4. The method of claim 1, wherein:

enabling provision of the message triggers the communication device to determine that an operator of a network device is approved to provide the message in the instance when the communication device determines that the operator is listed in a file indicating approved operators.

5. The method of claim 1, wherein:

the indication of the one or more cryptographic modules residing on the communication device is received in response to performing a security scan via a local area network.

6. The method of claim 1, wherein:

the determined output comprises a sequence of interleaved predetermined values and random values.

7. The method of claim 1, wherein in an instance when a predefined number of consecutive output values have occurred, the detected weak cryptographic module disables itself.

8. An apparatus comprising:

at least one computer processor; and at least one non-transitory memory device including computer program code stored thereon that, when executed by the at least one computer processor, cause the apparatus to perform at least the following:

receive an indication of one or more cryptographic modules each implementing a cryptographic algorithm residing on a communication device;

determine whether a cryptographic module of the one or more cryptographic modules is identified as a weak cryptographic module, wherein the weak cryptographic module is at least susceptible to a security breach;

generate a message that comprises at least one shared key and input challenge data and that, when processed by the weak cryptographic module, results in the generation of predefined output values that signify that the weak cryptographic module should remove or disable itself;

instruct the communication device to execute the detected weak cryptographic module to process the message comprising the at least one shared key and the input challenge data, wherein the software implementing the detected weak cryptographic module removes or disables itself in response to detecting that its generated output values comprise the predefined output values; and determine that the weak cryptographic module has been removed or disabled based on receiving an authentication value from an authentication attempt with the communication device that produces an invalid response.

9. The apparatus of claim 8, wherein prior to enable provision of the message, the at least one memory and the computer program code are further configured to, with the processor, cause the apparatus to:

instruct the communication device to execute a detected first strong cryptographic module of the one or more cryptographic modules to facilitate communications with the apparatus, wherein the first strong cryptographic module prevents at least a security breach.

10. The apparatus of claim 8, wherein the at least one memory and the computer program code are further configured to, with the processor, cause the apparatus to:

request a network entity to update the detected weak cryptographic module in response to determining that the communication device executes a detected strong cryptographic module to communicate with the apparatus, wherein the detected strong cryptographic module prevents at least a security breach.

11. The apparatus of claim 8, wherein the at least one memory and the computer program code are further configured to, with the processor, cause the apparatus to:

enable the provision of the message which triggers the communication device to determine that an operator of the apparatus is approved to provide the message in the instance when the communication device determines that the operator is listed in a file indicating approved operators.

12. The apparatus of claim 8, wherein the at least one memory and the computer program code are further configured to, with the processor, cause the apparatus to:

receive the indication of the one or more cryptographic modules residing on the communication device in response to performing a security scan via a local area network.

13. The apparatus of claim 8, wherein:

the determined output comprises a sequence of interleaved predetermined values and random values.

14. The apparatus of claim 8, wherein in an instance when a predefined number of consecutive output values have occurred, the detected weak cryptographic module disables itself.

* * * * *